(12) United States Patent
Kumar et al.

(10) Patent No.: US 9,296,964 B2
(45) Date of Patent: Mar. 29, 2016

(54) SYSTEM AND METHOD FOR PROTECTING A DIP TUBE

(75) Inventors: Anand Kumar, Bangalore (IN); Prashant Marikatti, Bangalore (IN)

(73) Assignee: General Electric Company, Schenectady, NY (US)

( * ) Notice: Subject to any disclaimer, the term of this patent is extended or adjusted under 35 U.S.C. 154(b) by 480 days.

(21) Appl. No.: 13/344,437

(22) Filed: Jan. 5, 2012

(65) Prior Publication Data

US 2013/0175476 A1 Jul. 11, 2013

(51) Int. Cl.
| | | |
|---|---|---|
| *C01B 7/00* | (2006.01) | |
| *C10J 3/84* | (2006.01) | |
| *C10J 3/48* | (2006.01) | |

(52) U.S. Cl.
CPC *C10J 3/845* (2013.01); *C10J 3/485* (2013.01); *C10J 2300/0959* (2013.01); *C10J 2300/0976* (2013.01); *C10J 2300/1838* (2013.01); *C10J 2300/1846* (2013.01); *Y02E 20/16* (2013.01); *Y02E 20/18* (2013.01); *Y02E 60/324* (2013.01)

(58) Field of Classification Search
CPC ........ C10J 3/845; C10J 3/485; C10J 2200/09; C10J 3/84; C10J 3/466; C10J 3/52; C10J 3/526; C10J 3/74; C10K 1/101; Y02E 20/18; B01D 2247/105; B01D 47/024
See application file for complete search history.

(56) References Cited

U.S. PATENT DOCUMENTS

| | | | |
|---|---|---|---|
| 3,864,100 A * | 2/1975 | Blaskowski | C10J 3/487 48/197 R |
| 4,218,423 A | 8/1980 | Robin et al. | |
| 4,444,726 A | 4/1984 | Crotty, Jr. et al. | |
| 4,624,683 A | 11/1986 | Dach | |
| 4,705,542 A * | 11/1987 | Gilmer | B01J 3/02 48/197 R |
| 4,778,483 A | 10/1988 | Martin et al. | |
| 4,801,306 A | 1/1989 | Denbleyker | |
| 4,801,307 A | 1/1989 | Muenger et al. | |
| 4,808,197 A | 2/1989 | Ayers | |
| 4,828,578 A | 5/1989 | Den Bleyker | |
| 4,828,579 A | 5/1989 | Becker et al. | |
| 4,828,580 A * | 5/1989 | Dach | 48/69 |
| 4,880,438 A | 11/1989 | Den Bleyker | |
| 4,902,303 A | 2/1990 | Den Bleyker | |
| 4,992,081 A | 2/1991 | Den Bleyker | |
| 7,846,226 B2 | 12/2010 | Leininger et al. | |
| 2009/0047193 A1 | 2/2009 | Corry et al. | |
| 2009/0202403 A1 | 8/2009 | Jimenez-Huyke et al. | |
| 2010/0018115 A1* | 1/2010 | Wallace et al. | 48/77 |

(Continued)

FOREIGN PATENT DOCUMENTS

| | | |
|---|---|---|
| EP | 0202783 A2 | 11/1986 |
| EP | 0374324 A1 | 6/1990 |

OTHER PUBLICATIONS

Search Report and Written Opinion from corresponding EP Application No. 13150240, dated Jul. 12, 2013.

(Continued)

*Primary Examiner* — Imran Akram

(74) *Attorney, Agent, or Firm* — Fletcher Yoder P.C.

(57) ABSTRACT

A system includes a dip tube configured to direct a gas toward a sump. The dip tube includes an inner surface and an outer surface. The system also includes a quench ring coupled to the dip tube. The quench ring is configured to provide a quench fluid flow to the sump over both the inner surface and the outer surface of the dip tube.

25 Claims, 3 Drawing Sheets

(56) References Cited

U.S. PATENT DOCUMENTS

| | | |
|---|---|---|
| 2010/0139581 A1* | 6/2010 | Ebner ............... C10J 3/485 122/7 R |
| 2010/0325954 A1 | 12/2010 | Tiwari et al. |
| 2010/0325956 A1 | 12/2010 | Dinu et al. |
| 2010/0325957 A1 | 12/2010 | Klockow et al. |
| 2013/0269530 A1* | 10/2013 | Schulze ............... C10J 3/526 95/289 |

OTHER PUBLICATIONS

EP Examination Report; Application No. EP 13150240.3-1361; Dated Jan. 29, 2015; 5 pages.

* cited by examiner

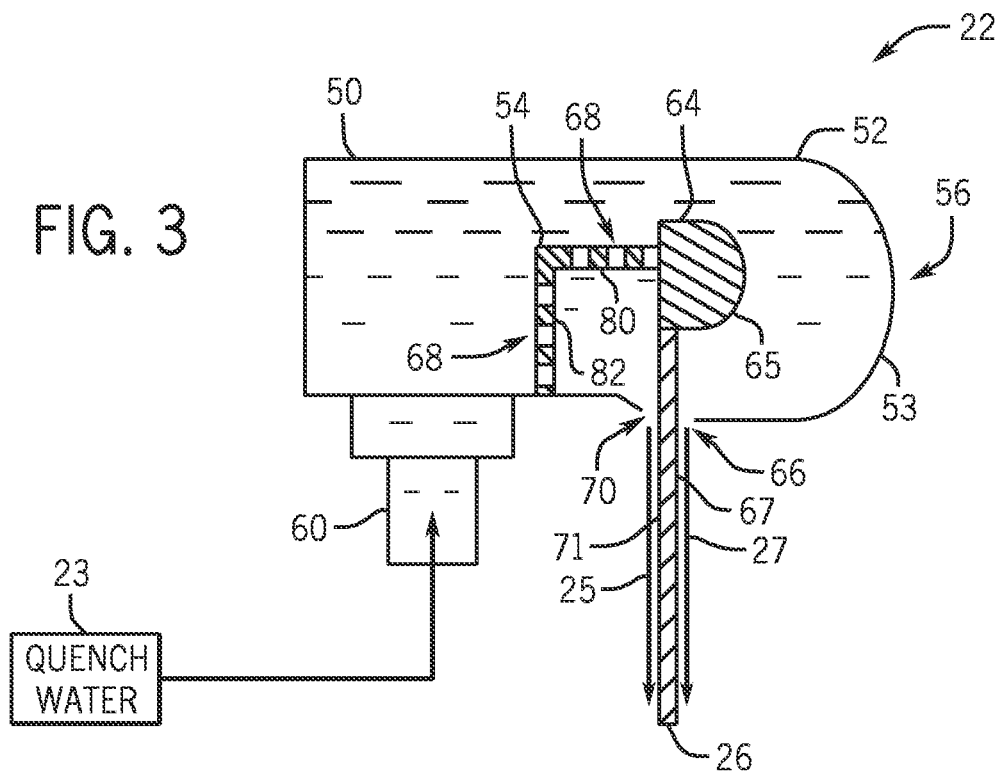
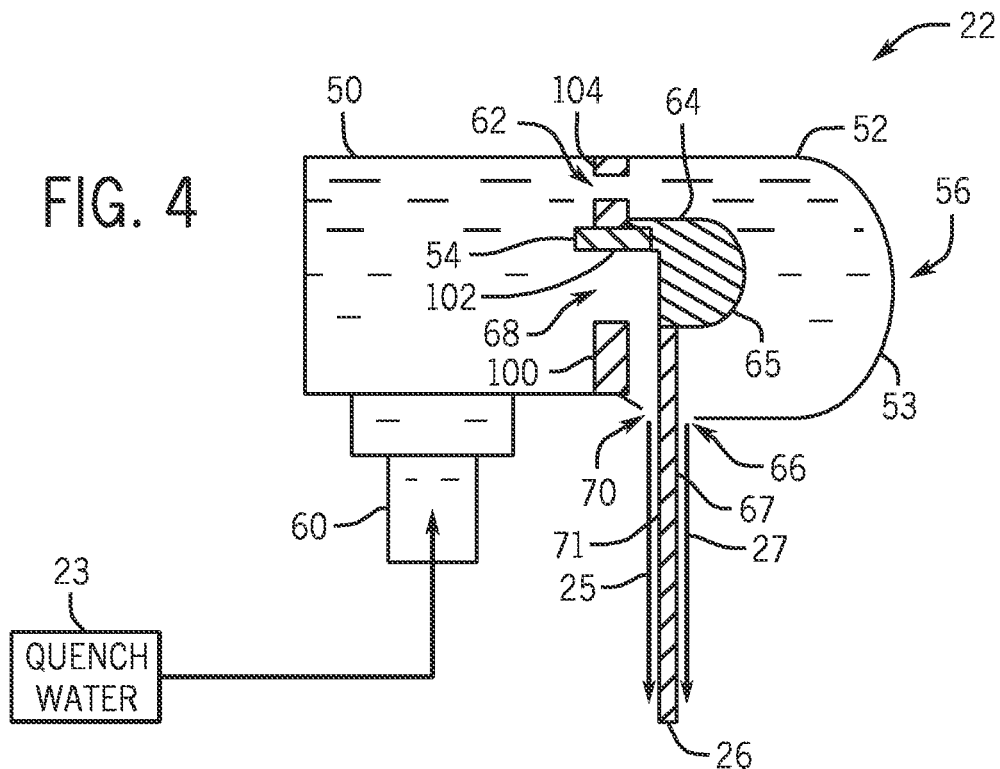

SYSTEM AND METHOD FOR PROTECTING A DIP TUBE

BACKGROUND OF THE INVENTION

The subject matter disclosed herein relates to gasifiers and, more particularly, to systems and methods for the design of quench rings and dip tubes for gasifiers.

Gasifiers convert carbonaceous materials into a mixture of carbon monoxide and hydrogen, referred to as synthesis gas or syngas. For example, an integrated gasification combined cycle (IGCC) power plant includes one or more gasifiers that react a feedstock at a high temperature with oxygen and/or steam to produce syngas. Upon gasification, the resulting syngas may include less desirable components, such as ash. Accordingly, the syngas may be directed through a quench unit to cool the syngas to a saturation temperature and remove the less desirable components, such as a slag. However, the lifespan of certain components of the quench unit may be affected by exposure to the syngas and/or slag, which may reduce the efficiency and/or operating range of the gasifier.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a dip tube configured to direct a gas toward a sump. The dip tube includes an inner surface and an outer surface. The system also includes a quench ring coupled to the dip tube. The quench ring is configured to provide a quench fluid flow to the sump over both the inner surface and the outer surface of the dip tube.

In a second embodiment, a system includes a gasifier, which includes a reaction chamber configured to convert a feedstock into a synthetic gas, a quench chamber configured to cool the synthetic gas, and a dip tube disposed downstream of the reaction chamber. The dip tube includes an inner surface and an outer surface. The gasifier also includes a quench ring configured to provide a quench fluid flow to the quench chamber over both the inner surface and the outer surface of the dip tube.

In a third embodiment, a method includes gasifying a feedstock in a reaction chamber to generate a synthetic gas and flowing the synthetic gas from the reaction chamber to a quench chamber through a dip tube. The dip tube includes an inner surface and an outer surface. The method also includes quenching the synthetic gas in the quench chamber to cool the synthetic gas. The quenching includes providing a quench fluid flow from a quench ring coupled to the dip tube. The method also includes protecting the dip tube by flowing the quench fluid flow over both the inner surface and the outer surface of the dip tube.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 3 is an axial cross-sectional view of an embodiment of a quench ring and a dip tube; and FIG. 4 is an axial cross-sectional view of an embodiment of a quench ring assembly and a dip tube.

DETAILED DESCRIPTION OF THE INVENTION

Figure 1:
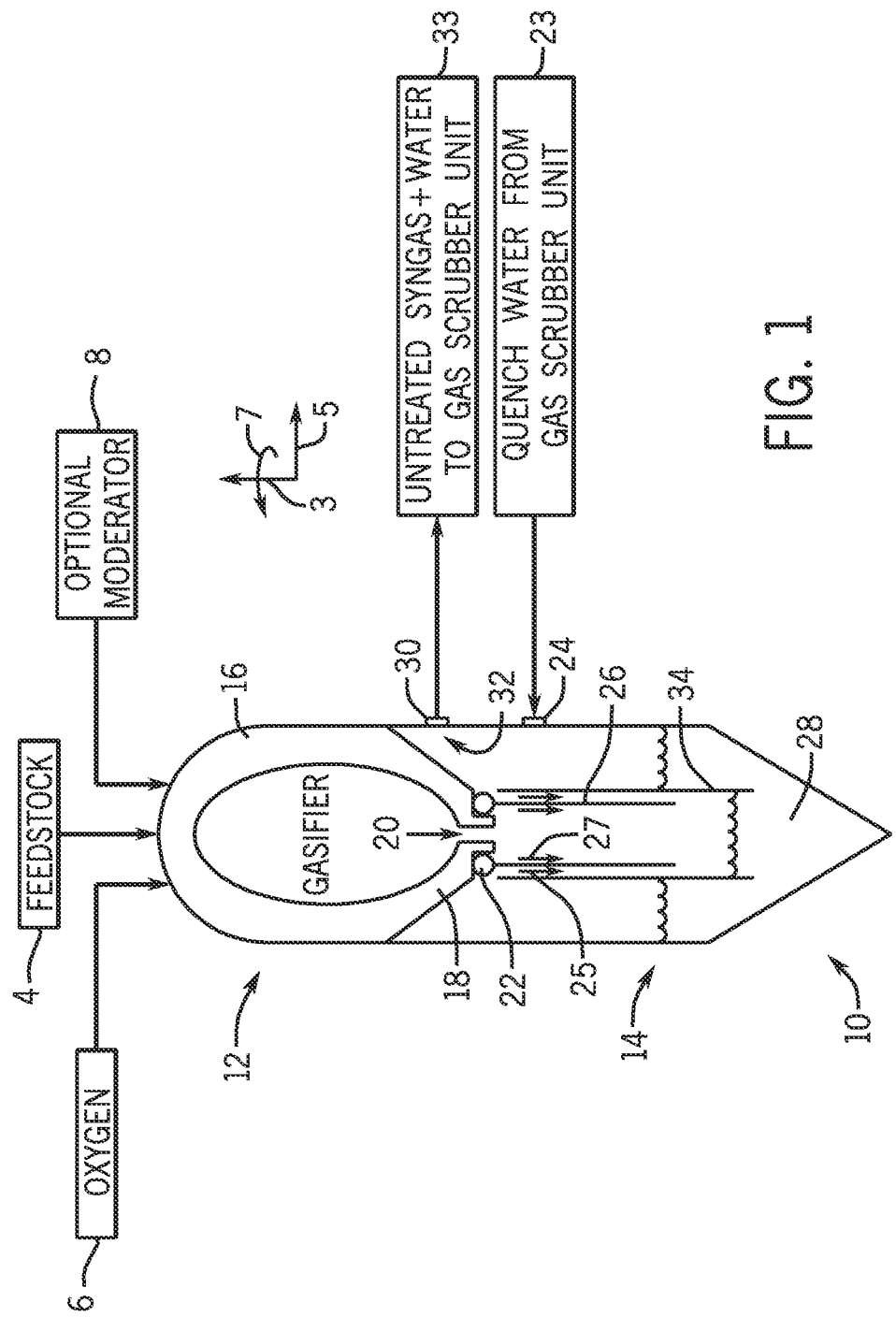
FIG. 1 is a schematic diagram of an exemplary embodiment of a gasifier incorporating a quench ring assembly and a dip tube.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As discussed in detail below, the disclosed embodiments include a dip tube configured to direct a gas toward a sump and a quench ring coupled to the dip tube. The dip tube may include an inner surface and an outer surface. For example, the inner surface may surround or face a gas flow and the outer surface may be opposite from the inner surface. The quench ring may provide a quench fluid flow (e.g., water flow, air flow, etc.) to the sump over both the inner surface and the outer surface of the dip tube. For example, the quench fluid flow over the inner and outer surfaces of the dip tube may substantially or completely cover the inner and outer surfaces. In addition, the quench fluid flows over the inner and outer surfaces may be the same or different from one another. In certain embodiments, a quench unit may include such a dip tube and quench ring assembly and be used in any type of gas treatment or processing unit. In other embodiments, the dip tube and quench ring may be included in a reactor, gasifier, or any other partial oxidation system, such as those found in power plants. For example, the gasifier may include a reaction chamber than converts a feedstock into a synthetic gas and a quench chamber that cools the synthetic gas. The gasifier may include the dip tube, which may be disposed between the reaction chamber and the quench chamber. The gasifier may also include the quench ring. The synthetic gas passing from the reaction chamber to the quench chamber may be at a high temperature, which may affect certain components of the gasifier, such as the dip tube. Thus, the quench fluid flow over both the inner surface and the outer surface of the dip tube may help protect the dip tube from the effects of the hot synthetic gas or molten slag produced in the reaction chamber. The synthetic gas and molten slag may collectively be referred to as hot products of gasification.

In certain embodiments, the inner surface of the dip tube may be exposed to the hot products of gasification. Thus, the quench fluid flow over the inner surface of the dip tube may help protect the dip tube by removing heat, thereby reducing a temperature of the dip tube. In addition, the quench fluid flow over the outer surface of the dip tube may help remove additional heat from the dip tube, thereby maintaining the temperature of the dip tube below a maximum threshold. Operating the dip tube above the maximum temperature threshold may cause problems such as, but not limited to, burnout, buckling, cracks, and similar failures. Such dip tube failures may cause leakage of hot gases in the entire quench system and hence may cause damage to the gasifier. Burnout may refer to when the dip tube comes in direct contact with the hot products of gasification. By helping to protect the dip tube, the quench fluid flow over both the inner surface and the outer surface may reduce the frequency of gasifier maintenance, thereby increasing the operating availability of the gasifier. In further embodiments, a method may include gasifying a feedstock in the reaction chamber to generate the synthetic gas, flowing the synthetic gas from the reaction chamber to the quench chamber through the dip tube, quenching the synthetic gas in the quench chamber to cool the synthetic gas, and protecting the dip tube by flowing the quench fluid flow over both the inner surface and the outer surface of the dip tube.

FIG. 1 is a schematic diagram of an exemplary embodiment of a gasifier 10, which may include a dip tube 26 protected by quench fluid flow on both its inner and outer surfaces. In the following discussion, reference may be made to various directions, such as an axial direction or axis 3, a radial direction or axis 5, and a circumferential direction or axis 7 of the gasifier 10. The dip tube 26 may be an annular tube, a square tube, a rectangular tube, an oval tube, a polygonal tube, or any other geometrically shaped tube. Accordingly, the inner surface may be an annular (or other shaped) inner surface, while the outer surface may be an annular (or other shaped) outer surface. The gasifier 10 may be divided into a reaction chamber 12 and a cooler 14 configured to cool gases generated in the reaction chamber 12. For example, the cooler 14 may include a quench unit, a quench chamber, a quench pool, a syngas cooler, a radiant syngas cooler, a convective syngas cooler, or any combination thereof. A protective barrier 16 may define the reaction chamber 12. The protective barrier 16 may act as a physical barrier, a thermal barrier, a chemical barrier, or any combination thereof. Examples of materials that may be used for the protective barrier 16 include, but are not limited to, refractory materials, refractory metals, non-metallic materials, clays, ceramics, cermets, and oxides of aluminum, silicon, magnesium, and calcium. In addition, the materials used for the protective barrier 16 may be bricks, castable, coatings, or any combination thereof. A feedstock 4, along with oxygen 6 and an optional moderator 8, such as steam, may be introduced through one or more inlets into the reaction chamber 12 of the gasifier 10 to be converted into a raw or untreated synthetic gas, e.g., a combination of carbon monoxide and hydrogen, which may also include slag and other contaminants. In certain embodiments, air or oxygen-rich air may be used instead of the oxygen 6. The untreated synthesis gas may also be described as untreated gas. The conversion in the gasifier 10 may be accomplished by subjecting the feedstock to steam and oxygen at elevated pressures, e.g., from approximately 20 bar to 100 bar, or 30 to 85 bar, and temperatures, e.g., approximately 1100 degrees C. to 1450 degrees C., depending on the type of gasifier 10 utilized. Under these conditions, the slag is in the molten state and is referred to as molten slag. In other embodiments, the molten slag may not be entirely in the molten state. For example, the molten slag may include solid (non-molten) particles suspended in molten slag.

The high-pressure, high-temperature untreated synthetic gas from the reaction chamber 12 may enter the cooler 14 through a bottom end 18 of the protective barrier 16, as illustrated by arrow 20. In general, the cooler 14 may be used to reduce the temperature of the untreated synthetic gas. In certain embodiments, a quench ring 22 may be located proximate to the bottom end 18 of the protective barrier 16. The quench ring 22 is configured to provide a quench fluid flow, such as quench water or quench air, to the cooler 14. In the illustrated embodiment (e.g., chemical applications), the cooler 14 may be a quench pool and the quench ring 22 may be located between the reaction chamber 12 and the quench pool. In other embodiments (e.g., power applications), the cooler 14 may be a syngas cooler and a quench chamber, and the quench ring 22 may be located between the syngas cooler and the quench chamber. In certain embodiments, the configuration of the protective barrier 16 may help protect the quench ring 22 from the synthetic gas and/or molten slag. As illustrated, quench water 23, or quench fluid flow, from a gas scrubber unit may be received through a quench water inlet 24 into the cooler 14 (e.g., quench chamber). In general, the quench water 23 may flow through the quench ring 22 and down the dip tube 26 into a quench chamber sump 28. The quench water 23 may flow down an outer surface of the dip tube 26, as indicated by arrow 25, and an inner surface of the dip tube 26, as indicated by arrow 27. In certain embodiments, the quench water flows 25 and 27 may be annular water flows 25 and 27 conforming to annular inner and outer surfaces. However, the flows 25 and 27 may be other shaped flows conforming to the inner and outer surfaces. As such, the quench water 23 may cool the untreated synthetic gas, which may subsequently exit the quench chamber 14 through a synthetic gas outlet 30 after being cooled, as illustrated by arrow 32. In certain embodiments, the quench water 24 may include any liquid or gaseous coolant, such as an inert gas or other fluid. In other words, although the depicted embodiment uses quench water 23, any quench fluid 23 (e.g., liquid and/or gas) may be used as a coolant. In some embodiments, a coaxial draft tube 34 may surround the dip tube 26 to create an annular passage through which the untreated synthetic gas may rise. The synthetic gas outlet 30 may generally be located separate from and above the quench chamber sump 28 and may be used to transfer the untreated synthetic gas and any water to the gas scrubber unit for treatment, as indicated by block 33. For example, the gas scrubber unit may remove fine solid particles and other contaminants. In addition, the gas scrubber unit may remove entrained water from the untreated synthetic gas, which may then be used as quench water 23 within the quench chamber 14 of the gasifier 10. The treated synthetic gas from the gas scrubber unit may ultimately be directed to a chemical process or a combustor of a gas turbine engine, for example.

Figure 2:
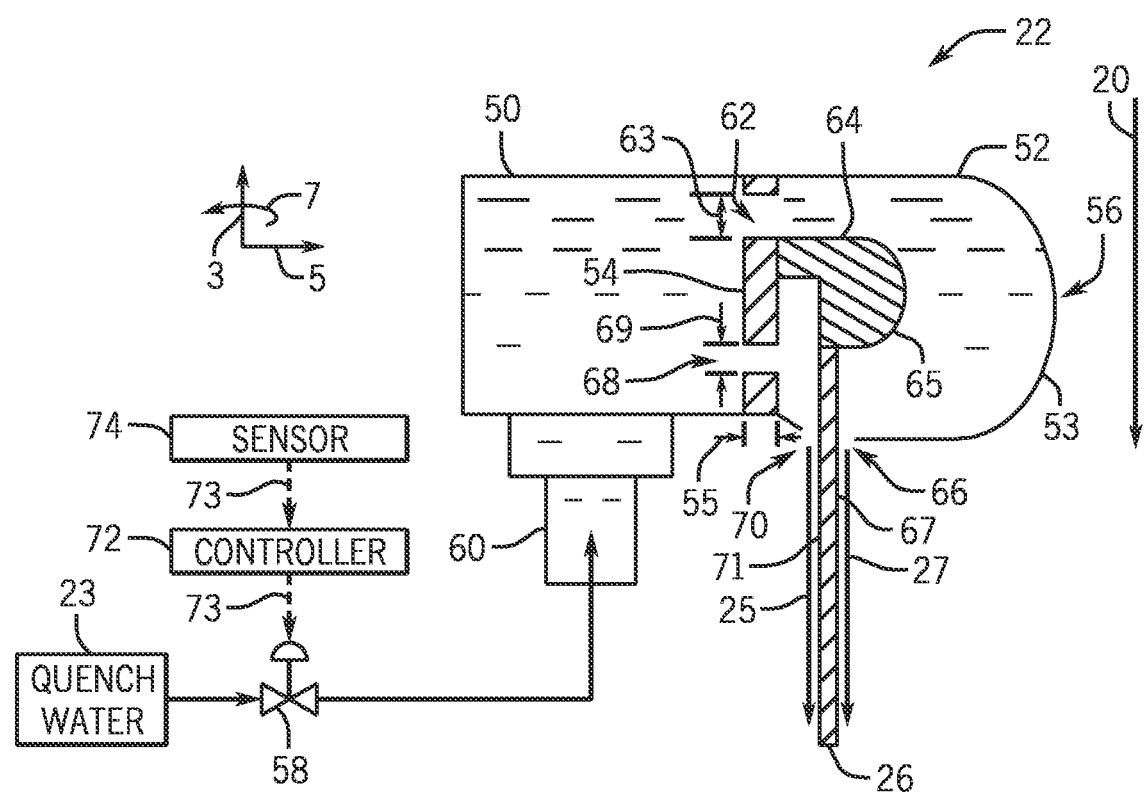
FIG. 2 is an axial cross-sectional view of an embodiment of a quench ring assembly and a dip tube.

FIG. 2 is an axial cross-sectional view of the quench ring 22 (e.g., a hollow annular ring) and a portion of the dip tube 26 (e.g., annular tube). Elements in FIG. 2 in common with those shown in FIG. 1 are labeled with the same reference numerals. In the illustrated embodiment, the quench ring 22 includes an outer chamber 50 (e.g., outer annular chamber) and an inner chamber 52 (e.g., inner annular chamber) separated by a partition 54 (e.g., annular partition). The partition 54 may be defined by a thickness 55, which may be adjusted to provide sufficient strength for the partition 54. A hot face 56 of the inner chamber 52 faces toward the untreated synthetic gas flowing from the reaction chamber 12 to the cooler 14. In certain embodiments, the quench water 23 may flow through a quench water valve 58 prior to entering a quench water supply 60 coupled to the quench ring 22. The quench water valve 58 may adjust a flow rate of the quench water 23 to the quench ring 22. As shown in FIG. 2, the partition 54 may include an inner partition opening 62, which enables the quench water 23 to flow from the outer chamber 50 to the inner chamber 52. The inner partition opening 62 may be a continuous, annular slot formed in the partition 54 or a plurality of openings formed in the partition 54. The inner partition opening 62 may be defined by an inner partition diameter or height 63, which may be selected to adjust a flow rate of the quench water 23 through the inner partition opening 62. For example, a larger inner partition opening 62 may enable a higher flow rate of the quench water 23 into the inner chamber 52. Similarly, a smaller inner partition opening 62 may enable a lower flow rate of the quench water 23 into the inner chamber 52. In addition, a shape of the inner partition opening 62 may be selected to further adjust the flow rate of the quench water 23 into the inner chamber 52.

In certain embodiments, a flow baffle 64 (e.g., annular baffle) may be disposed in the inner chamber 52 to help direct the quench water 23 against the hot face 56. For example, a shape 65 (e.g., curved shape) of the flow baffle 64 may correspond generally to a shape 53 (e.g., curved shape) of the inner chamber 52 along the hot face 56. Thus, the flow baffle 64 may help direct the flow of the quench water 23 against the hot face 56, where additional cooling of the quench ring 22 may be desired. In certain embodiments, the flow baffle 64 may be coupled to the partition 54, the dip tube 26, the quench ring 22, or any combination thereof. After flowing around the flow baffle 64, the quench water 23 may exit the quench ring 22 through an inner quench ring opening 66, which enables the quench water 23 to flow over an inner surface 67 (e.g., inner annular surface) of the dip tube 26, as indicated by the arrow 27. As shown in FIG. 2, the inner surface 67 surrounds or faces the untreated synthetic gas from the reaction chamber 12, as illustrated by the arrow 20. In certain embodiments, the quench ring 22 may include a plurality of inner quench ring openings 66 disposed circumferentially about the quench ring 22. In further embodiments, the plurality of inner quench ring openings 66 may be configured to impart a swirling motion (e.g., in the circumferential direction 7) to the flow of the quench water 23 along the inner surface 67. For example, each of the inner quench ring openings 66 may be aligned at an angle to the axial axis 3 of the gasifier 10. The inner quench ring openings 66 may also be used to adjust the flow rate of the quench water 23 along the inner surface 67.

As shown in FIG. 2, the partition 54 may include an outer partition opening 68, which may enable the quench water 23 to flow from the outer chamber 50 along an outer surface 71 (e.g., outer annular surface) of the dip tube 26. The outer surface 71 may be opposite from the inner surface 67. In addition, the outer partition opening 68 may be configured as a continuous, annular slot or as a plurality of openings in the partition 54. In addition, a diameter or height 69 of the outer partition 68 may be selected to adjust a flow rate of the quench water 23 along the outer surface 71, which may be the same or different from the flow rate of the quench water 23 along the inner surface 67. In addition, a shape of the outer partition opening 68 may be selected to adjust the flow rate of the quench water 23. As shown in FIG. 2, the configuration of the flow baffle 64 and the dip tube 26 block the quench water 23 flowing through the outer partition opening 68 from entering the inner chamber 52. Instead, the quench water 23 exits through an outer quench ring opening 70 to flow over the outer surface 71, as indicated by the arrow 25. In certain embodiments, the outer quench ring openings 70 may be configured to impart a swirling motion (e.g., in the circumferential direction 7) to the quench water 23 flowing over the outer surface 71 in a manner similar to the inner quench ring opening 66. Such swirling motion of the quench water 23 may help provide a more even or distributed flow of the quench water 23 over the inner and outer surfaces 27 and 25 of the dip tube 26. The swirling motion of the quench water 23 along the outer surface 71 may be in the same direction or opposite from the swirling motion of the quench water 23 along the inner surface 67. The outer quench ring openings 70 may also be used to adjust the flow rate of the quench water 23 along the outer surface 71. As shown in FIG. 2, the design of the partition 54 may be relatively simple and retrofittable to existing quench rings 22.

By providing the quench water 23 over both the inner and outer surfaces 27 and 25 of the dip tube 26, the dip tube 26 is protected from the effects of the untreated synthetic gas and slag from the reaction chamber 12. For example, any interruption of the quench water 23 flowing along the inner surface 27 may cause a portion of the dip tube 26 to be exposed to the untreated synthetic gas. Interruptions may be caused by plugging of the inner quench ring openings 66, for example. However, the flow of the quench water 23 over the outer surface 71 may provide sufficient cooling to protect the dip tube 26 from effects such as burnout. In addition, the flow of the quench water 23 over both the inner and outer surfaces 27 and 25 reduces temperature gradients across the dip tube 26 that may cause buckling. In certain embodiments, a ratio of the outer quench flow 27 to the inner quench flow 25 may be controlled to help reduce the temperature gradient across the dip tube 26. Thus, flowing the quench water 23 over both the inner and outer surfaces 27 and 25 provides additional protection to the dip tube 26 compared to flowing the quench water 23 over only the inner surface 27.

In certain embodiments, a controller 72 may transmit a signal 73 to the quench water valve 58 in response to a signal 73 received from a sensor 74. For example, the sensor 74 may be disposed elsewhere in the gasifier 10 to indicate a condition within the gasifier 10. For example, the sensor 74 may indicate a temperature of the untreated synthetic gas. If the temperature of the untreated synthetic gas exceeds a maximum threshold, the controller 72 may send a signal 73 to the quench water valve 58 to increase the flow rate of the quench water 23 to the quench ring 22. In other embodiments, the sensor 74 may indicate pressure, a plugging condition, slag flow along an interior, slag output, fuel type, feed rate (e.g., fuel, oxygen, etc.), and so forth. In certain embodiments, separate coolants (e.g., liquids and/or gases) may be directed to the inner and outer chambers 52 and 50. For example, an inner quench fluid flow may include a liquid, such as water, and an outer quench fluid flow may include a gas, such as an inert gas. In other embodiments, the outer and inner quench flows 25 and 27 may be separately controlled to vary the ratio of the outer quench flow 24 to the inner quench flow 27. For example, separate supply lines and valves could be used to supply the outer and inner quench flows 25 and 27 to provide active control of the flows along the outer and inner surfaces 71 and 67.

FIG. 3 is an axial cross-sectional view of an embodiment of the quench ring 22 and the dip tube 26. Elements in FIG. 3 in common with those shown in FIG. 2 are labeled with the same reference numerals. In the illustrated embodiment, the quench water valve 58, the controller 72, and the sensor 74 are omitted for clarity. As shown in FIG. 3, the partition 54 divides the quench ring 22 into the outer and inner chambers 50 and 52. The partition 54 includes a plurality of outer partition openings 68. Thus, the quench water 23 flows through the outer partition openings 68 and through the outer quench ring opening 70 to flow over the outer surface 71. As shown in FIG. 3, the partition 54 includes a horizontal portion 80 (e.g., a disc-shaped wall) and vertical portion 82 (e.g., an annular wall). The horizontal portion 80 is coupled to the flow baffle 64, and the vertical portion 82 is coupled to the horizontal portion 80 and the outer chamber 50 of the quench ring 22. Thus, the flow rate of the quench water 23 to the outer surface 71 may be specified by the number and arrangement of the outer partition openings 68, with the balance of the quench water 23 flowing over the inner surface 67. In further embodiments, other configurations and arrangements of the partition 54 are possible.

FIG. 4 is an axial cross-sectional view of an embodiment of the quench ring 22 and the dip tube 26. Elements in FIG. 4 in common with those shown in FIG. 2 are labeled with the same reference numerals. As shown in FIG. 4, the partition 54 divides the quench ring 22 into the outer and inner chambers 50 and 52. Specifically, the partition 54 includes a lower vertical portion 100 (e.g., an annular wall), a horizontal portion 102 (e.g., a disc-shaped wall), and an upper vertical portion 104 (e.g., an annular wall). The lower vertical portion 100 may be coupled to the quench ring 22, the horizontal portion 102 may be coupled to the flow baffle 64, and the upper vertical portion 104 may be coupled to the quench ring 22. In the illustrated embodiment, the upper vertical portion 104 includes the inner quench ring opening 62. In addition, the horizontal portion 102 and the lower vertical portion 100 together create the outer partition opening 68. Such an arrangement of the partition 56 may enable a higher flow rate of the quench water 23 to flow over the outer surface 71 compared to the inner surface 67.

As described above, certain embodiments of the gasifier 10 may include the quench ring 22 and the dip tube 26, wherein both the inner surface 67 and the outer surface 71 of the dip tube 26 are protected by the quench water 23. Thus, both the inner and outer surfaces 67 and 71 may be protected from the effects of the high temperature untreated synthetic gas and slag from the reaction chamber 12. In certain embodiments, certain features of the quench ring 22 may be configured to provide and/or adjust flow rates of the quench water 23 along the inner and outer surfaces 67 and 71. For example, sizes and/or configurations of the inner and outer partition openings 62 and 68 may be used to provide certain flow rates of the quench water 23. In addition, sizes and configurations of the inner and outer quench ring openings 66 and 70 may be used to provide certain flow rates of the quench water 23. In further embodiments, the quench water valve 58 may be used to adjust an overall flow rate of the quench water 23 to the quench ring 22 in response to changing conditions within the gasifier 10. By providing additional protection from the effects of high temperature using quench water flow over both the inner and outer surfaces 67 and 71, the life of the dip tube 26 may be extended, thereby extending the operational availability of the gasifier 10. Specifically, the dip tube 26 may be protected from various conditions, such as metal burnout caused by high temperature and/or buckling caused by thermal gradients.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
    a dip tube configured to direct a gas toward a sump, wherein the dip tube comprises an inner surface and an outer surface; and
    a quench ring coupled to the dip tube, wherein the quench ring comprises an inner fluid outlet disposed above the inner surface and an outer fluid outlet disposed above the outer surface, the inner fluid outlet is configured to direct a quench fluid flow onto the inner surface of the dip tube to flow downwardly along the inner surface toward the sump, and the outer fluid outlet is configured to direct the quench fluid flow onto the outer surface of the dip tube to flow downwardly along the outer surface toward the sump.

2. The system of claim 1, wherein the inner fluid outlet of the quench ring comprises a plurality of inner quench ring openings configured to provide an inner quench fluid flow to the inner surface, and the outer fluid outlet of the quench ring comprises a plurality of outer quench ring openings configured to provide an outer quench fluid flow to the outer surface.

3. The system of claim 2, wherein the plurality of inner quench ring openings and the plurality of outer quench ring openings are angled to impart a swirling motion to the inner quench fluid flow and the outer quench fluid flow.

4. The system of claim 1, comprising a partition disposed inside the quench ring, wherein the partition is configured to divide the quench fluid flow into an inner quench fluid flow configured to flow over the inner surface and an outer quench fluid flow configured to flow over the outer surface.

5. The system of claim 4, comprising a flow baffle disposed in the quench ring, wherein the flow baffle is configured to direct the inner quench fluid flow against a hot face surface of the quench ring.

6. The system of claim 4, wherein the partition comprises an inner partition opening configured to provide the inner quench fluid flow and an outer partition opening configured to provide the outer quench fluid flow.

7. The system of claim 6, wherein the inner partition opening is configured to provide a first flow rate of the inner quench fluid flow and the outer partition opening is configured to provide a second flow rate of the outer quench fluid flow.

8. The system of claim 6, wherein the inner partition opening and the outer partition opening each comprise a plurality of openings.

9. The system of claim 1, wherein the quench fluid flow comprises at least one of water, or an inert gas, or a combination thereof.

10. The system of claim 1, wherein the inner fluid outlet of the quench ring is configured to provide an inner quench fluid flow to the sump over the inner surface and the outer fluid outlet of the quench ring is configured to provide an outer quench fluid flow over the outer surface, wherein the inner quench fluid flow and the outer quench fluid flow are different from one another.

11. The system of claim 1, comprising at least one of a quench unit, a gasifier, a reactor, or a partial oxidation system, or any combination thereof, having the dip tube and the quench ring.

12. The system of claim 1, wherein the quench ring is configured to output the quench fluid flow from the inner and outer fluid outlets directly onto the respective inner and outer surfaces of the dip tube.

13. The system of claim 1, wherein the inner fluid outlet is disposed adjacent the inner surface of the dip tube, and the outer fluid outlet is disposed adjacent the outer surface of the dip tube.

14. The system of claim 1, wherein the dip tube extends at least partially into an interior chamber of the quench ring.

15. The system of claim 1, wherein the quench ring is configured to output the quench fluid flow as a cascade or waterfall that falls downwardly along the inner and outer surfaces of the dip tube toward the sump.

16. The system of claim 1, wherein a ratio of the quench fluid flow along the inner and outer surfaces of the dip tube is controlled to reduce a temperature gradient across the dip tube.

17. A system, comprising:
 a gasifier, comprising:
  a reaction chamber configured to convert a feedstock into a synthetic gas;
  a quench chamber configured to cool the synthetic gas;
  a sump;
  a dip tube disposed downstream of the reaction chamber, wherein the dip tube comprises an inner surface and an outer surface; and
  a quench ring comprising an inner fluid outlet disposed above the inner surface and an outer fluid outlet disposed above the outer surface, wherein the inner fluid outlet is configured to direct a quench fluid flow onto the inner surface of the dip tube to flow downwardly along the inner surface toward the sump, and the outer fluid outlet is configured to direct the quench fluid flow to the outer surface of the dip tube to flow downwardly along the outer surface toward the sump.

18. The system of claim 17, wherein the inner fluid outlet of the quench ring comprises a plurality of inner quench ring openings configured to provide the quench fluid flow to the inner surface, and the outer fluid outlet of the quench ring comprises a plurality of outer quench ring openings configured to provide the quench fluid flow to the outer surface.

19. The system of claim 17, comprising a partition disposed inside the quench ring, wherein the partition is configured to divide the quench fluid flow into an inner quench fluid flow configured to flow over the inner surface and an outer quench fluid flow configured to flow over the outer surface.

20. The system of claim 19, wherein the partition comprises an inner partition opening configured to provide the inner quench fluid flow and an outer surface partition configured to provide the outer quench fluid flow.

21. The system of claim 19, comprising:
 a quench fluid valve configured to adjust a flow rate of the quench fluid flow to the quench ring; and
 a controller configured to control the quench fluid valve to adjust the flow rate of the quench fluid flow.

22. A method, comprising:
 gasifying a feedstock in a reaction chamber to generate a synthetic gas;
 flowing the synthetic gas from the reaction chamber to a quench chamber through a dip tube, wherein the dip tube comprises an inner surface and an outer surface;
 quenching the synthetic gas in the quench chamber to cool the synthetic gas, wherein quenching comprises providing a quench fluid flow from a quench ring coupled to the dip tube;
 outputting the quench fluid flow through an inner fluid outlet of the quench ring above the inner surface of the dip tube;
 outputting the quench fluid flow through an outer fluid outlet of the quench ring above the outer surface of the dip tube; and
 protecting the dip tube by flowing the quench fluid flow over the inner surface of the dip tube via the inner fluid outlet and the outer surface of the dip tube via the outer fluid outlet, wherein the quench fluid flow moves downwardly along the inner and outer surfaces toward a sump.

23. The method of claim 22, comprising dividing the quench fluid flow in the quench ring into an inner quench fluid flow configured to flow over the inner surface and an outer quench fluid flow configured to flow over the outer surface using a partition disposed inside the quench ring.

24. The method of claim 23, comprising:
 providing the inner quench fluid flow through an inner partition opening disposed in the partition; and
 flowing an outer quench fluid flow through an outer partition opening disposed in the partition.

25. The method of claim 22, comprising:
 flowing an inner quench fluid flow configured to flow over the inner surface through a plurality of the inner quench ring openings disposed in the quench ring; and
 flowing an outer quench fluid flow configured to flow over the outer surface through a plurality of the outer quench ring openings disposed in the quench ring.

* * * * *